July 29, 1969  R. A. POHL ET AL  3,458,161
PILOT AERIAL SURVIVAL SYSTEM
Filed Dec. 29, 1967  3 Sheets-Sheet 3

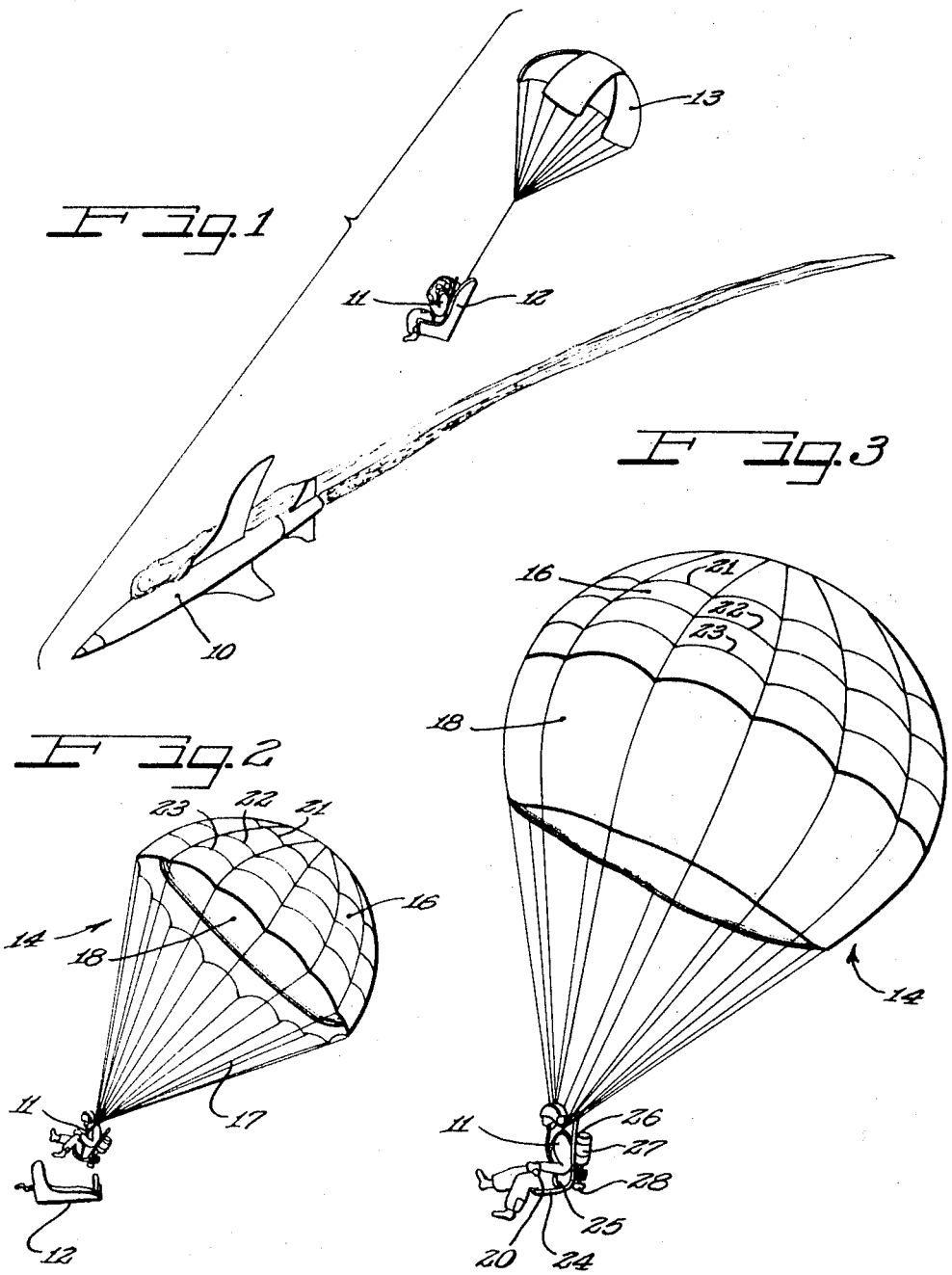

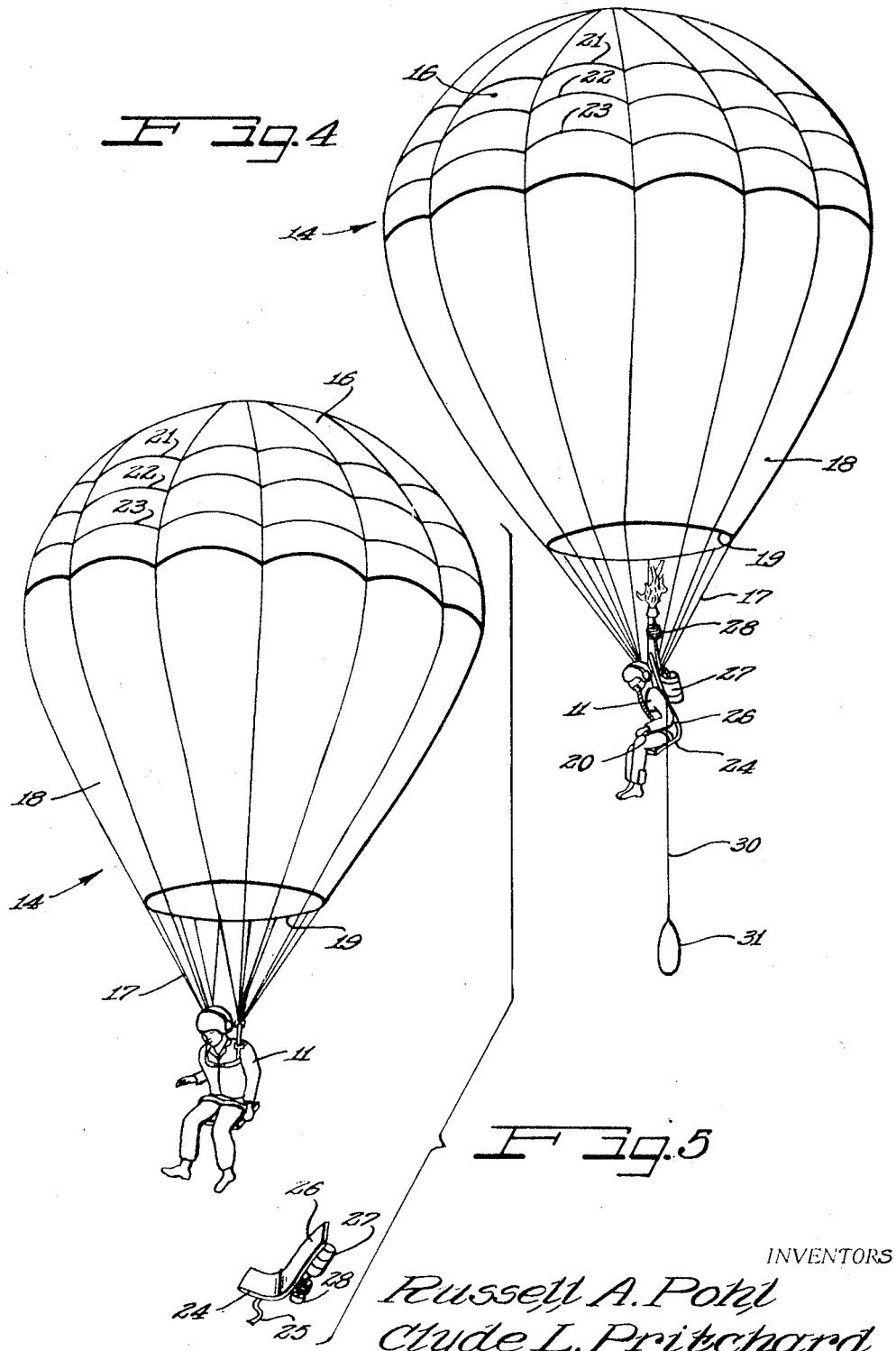

INVENTORS
Russell A. Pohl
Clyde L. Pritchard
BY ATTORNEYS

United States Patent Office 3,458,161
Patented July 29, 1969

3,458,161
PILOT AERIAL SURVIVAL SYSTEM
Russell A. Pohl and Clyde L. Pritchard, Sioux Falls,
S. Dak., assignors to Raven Industries, Inc., Sioux Falls,
S. Dak., a corporation of South Dakota
Filed Dec. 29, 1967, Ser. No. 694,699
Int. Cl. B64c 1/40; B64d 1/00, 25/10
U.S. Cl. 244—32                                    18 Claims

ABSTRACT OF THE DISCLOSURE

Apparatus and method of ejecting and safely descending from an aircraft or other airborne structure including a decelerating canopy in combination with a lower panel so as to comprise an aerostat and having heating means so as to allow the aerostat when inflated to support the user or cargo and the method of ejecting such structure and accomplishing air-to-air pickup of the pilot or material or alternatively allowing the pilot to control his descent so as to pick a suitable landing area.

CROSS REFERENCES TO RELATED APPLICATIONS

Decelerator canopy and aerostat envelope disclosed in this invention is disclosed and claimed per se in copending application entitled "Decelerator Canopy and Aerostat Envelope" Ser. No. 694,698.

BACKGROUND OF THE INVENTION

Field of the invention

This invention relates to the field of apparatus and a method for allowing a pilot or other passenger of an aircraft to eject, decelerate himself and then control his rate of descent with a declerator canopy aerostat envelope comprising a generally hemispherical parachute shaped first portion and a lower portion attached to the parachute portion so as to form an aerostat. A heater is attached to the user and may be turned on to provide heated air into the aerostat structure so as to sustain altitude or to control the rate of descent as desired. Reinforcing webbings are formed about the structure so that an aircraft provided with hooks may engage the webbing and thus make an air-to-air pickup of the pilot.

Description of the prior art

Both parachutes and balloons have been known for many years, but the present invention discloses a combination parachute formable into a balloon structure and which has reinforcing webbing formed about the structure when inflated so as to allow air-to-air pickup.

BRIEF SUMMARY OF THE INVENTION

The combination decelerator canopy and aerostat envelope is provided for use with a pilot or other passenger who may eject from a disabled aircraft, inflate the decelerator canopy into a generally parachute shape and said invention formed with a lower panel portion which is packed into the parachute during storage and which descends to form an aerostat structure when in use. A heater is attached to the user and may be ignited to provide heated air to cause the balloon structure thus formed to sustain altitude thus allowing the pilot to sustain altitude so that he may be picked up by air-to-air pickup. Reinforcing strips of material are attached to the structure to allow engagement with hooks carried by suitable aircraft for air-to-air pickup. Alternately, the pilot may control the heating rate and thus control his altitude and pick a suitable place of descent. Prior to ground contact the heater may be jettisoned.

Other and further objects of this invention will be apparent to those skilled in this art from the following detailed description and the annexed sheets of drawings which show several embodiments of the invention.

BRIEF DESCRIPTION OF THE DRAWINGS

FIGURE 1 illustrates an aircraft which has been disabled from which a pilot has ejected and in which a pilot chute has been deployed to withdraw the main chute and structure of this invention for support.

FIGURE 2 shows deployment of the decelerator canopy by the pilot after ejection.

FIGURE 3 illustrates the partial deployment of the lower portion of the structure to form an aerostat envelope.

FIGURE 4 illustrates the decelerator canopy and aerostat envelope completely deployed with the heater ignited for controlling the rate of descent.

FIGURE 5 illustrates the pilot preparatory to ground landing having jettisoned the heater and seat structure.

DETAILED DESCRIPTION OF THE INVENTION

Figure 6:
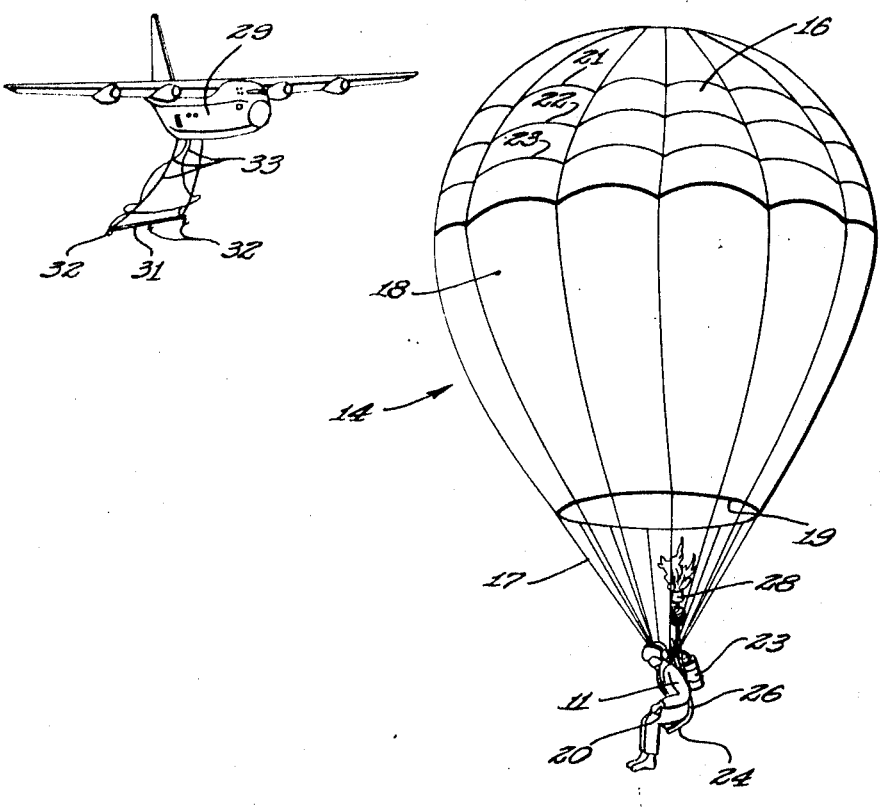
FIGURE 6 illustrates an air-to-air pickup by an aircraft.

FIGURE 1 illustrates an aircraft which has become disabled and from which a pilot 11 has ejected with his aircraft seat 12. A pilot chute 13 has been automatically ejected by control means forming a part of the survivial system.

FIGURE 2 illustrates the deployment of a decelerator canopy and aerostat envelope designated generally as 14. The pilot 11 has manually or automatically jettisoned the aircraft seat 12. The parachute shaped portion 16 of the decelerator canopy and aerostat 14 has been deployed and is attached to the pilot by suitable shroud lines 17. The lower aerostat forming portion 18 of the structure is folded into the hemispherical confines of the parachute 16 and in FIGURE 2 is starting to descend.

FIGURE 3 illustrates the lower aerostat forming portion 18 descending further from the parachute portion 16. It is to be noted that the lower portion 18 is attached to the parachute portion along the overlap where the shroud lines 17 engage the portion 18, and the shroud lines 17 are not attached to the portion of the lower portion 18 below the parachute 16. A heater 27 is pivotally attached to a secondary chair 24 which is formed with a back 26 which is stored in the aircraft seat 12 during normal operation of the aircraft. A seatbelt 25 holds the secondary seat 24 to the pilot. The burner 27 is formed with a burning portion 28 which in the stored position is pivoted downwardly as shown in FIGURES 2 and 3 but which may be pivoted upwardly by a control box 20 engageable by the pilot to assume the position shown in FIGURE 4. The heater could also be mounted to telescope or in any other suitable manner.

FIGURE 4 shows the decelerating canopy and aerostat structure completely deployed and with the lower end 19 of the aerostat portion terminating above the pilot's head. The pilot has pivoted the burner 28 of the heater 27 to a position below the opening 19 formed in the lower end of the aerostat and has ignited the burner by the control box 20. The heater may be of the type such as described in Patent No. 3,096,048, for example. The detailed construction of the parachute portion 18 is described in detail in copending application entitled "Decelerator Canopy and Aerostat Envelope" referenced above. Formed about the parachute portion 16 are a plurality of straps 21, 22 and 23 which extend circumferentially about the parachute portion and which are attached to the shroud lines 17. The portions of these pickup lines between the adjacent shroud lines are not attached to the parachute 16 and may be engaged by a suitable hook for air-to-air pickup as illustrated in FIGURE 6.

The control box 20 also contains a control for the heater 27 which will allow the heating rate of air to be controlled. In this manner, the pilot 11 may ignite the burner 28 of the heater and may also control its rate of heating air in the aerostat 14 so as to control his rate of descent. With a high heating rate, he may sustain his altitude or even climb. With a lower heating rate, he can slowly descend toward the ground.

In operation, the pilot 11 ejects from his disabled aircraft 10 as shown in FIGURE 1. The pilot chute 13 is automatically deployed by the ejection mechanism, and the pilot manually or either automatically through suitable controls in the ejection system jettisons the aircraft seat 12 as shown in FIGURE 2. By this time, the decelerating canopy 16 has been deployed and the pilot is being decelerated. The lower portion 18 of the structure of the invention is starting to descend in FIGURE 3, and in FIGURE 4 the pilot has pivoted his heater into the operating position with the burner under the opening 19 of the aerostat. He has also ignited the burner with his control 20. In FIGURE 5, the pilot has controlled his descent so that he is near the ground and is preparing to engage the ground. Prior to landing, he releases the seat belt 25 to jettison the seat 24 and the heater 27 which is attached to it. He then makes a soft landing and collapses the aerostat.

If desired, the method and structure illustrated in FIGURE 6 may be utilized to make an air-to-air pickup. The pilot 11 has through the use of his control box 20 turned on his heater 27 and the burner 28 has been pivoted up below the opening 19 of the aerostat so as to control or sustain the aerostat. An aircraft 29 is formed with a suitable harness containing lines 33 upon which a boom 31 is attached. Hooks 32 are attached to the boom 31 and are engageable with the pickup lines 21, 22 and 23 which are attached to the aerostat structure 14. The aircraft 29 in slow flight configuration passes by the aerostat 14 and allows the hooks 32 to engage the pickup straps 21, 22, or 23. A suitable winch is attached to the lines 33 and the boom, and the aerostat and pilot may be winched aboard the aircraft. Although a conventional aircraft 29 is disclosed in FIGURE 6, it is to be, of course, realized that a helicopter or other type of craft may be also used for making an air-to-air recovery.

Thus, it is seen with this invention that a pilot may be ejected over rough terrain or even enemy territory, deploy his aerostat and decelerator envelope and by the use of the heater 27 sustain altitude or even climb and control his position of descent. Also, the structure may be recovered by an air-to-air pickup such as shown in FIGURE 6.

FIGURE 4 also illustrates another method of air-to-air pickup. A lanyard 30 is attached to pilot 11 and has a loop 31 at its lower end. A helicopter, not shown, can project a line through loop 31 and then be firmly attached to lanyard 30. The helicopter may then tighten its line and the lanyard and the pilot may release himself from the seat 24 and be reeled into the helicopter.

We claim as our invention:

1. A pilot aerial survival system comprising a decelerator canopy and aerostat envelope normally packed and worn by an aircraft occupant, a pilot chute for deploying said canopy and aerostat envelope when the occupant ejects, said decelerating canopy and aerostat envelope initially assuming a parachute shape and then forming an aerostat envelope, shroud lines passing over and attached to said canopy, support means attached to the downwardly extending ends of said shroud lines and said aircraft occupant supported thereby, said aerostat envelope attached to said decelerator canopy only along the shroud lines, and the lower portion of said aerostat envelope not connected to said shroud lines.

2. Apparatus according to claim 1, a heater mounted on the support means so that it may be moved to an operable position and ignited to heat air in the aerostat envelope.

3. Apparatus according to claim 2, control means associated with the heater to allow its heating rate to be governed.

4. Apparatus according to claim 2, wherein said support means comprises an auxiliary seat structure, said heater mounted on the auxiliary seat structure and control means for said heater to move it to an operative position.

5. Apparatus according to claim 4 wherein said control means ignites said heater.

6. Apparatus according to claim 1, an aircraft seat to which the occupant is attached during ejectment, and said aircraft seat detachably connected to the occupant so that it may be jettisoned.

7. Apparatus according to claim 1, pickup means attached to the decelerator canopy and aerostat envelope to allow air-to-air pickup.

8. Apparatus according to claim 7 wherein said pickup means comprise flexible means.

9. Apparatus according to claim 7 wherein said pickup means comprise loops of flexible material attached to the decelerator canopy and aerostat envelope.

10. Apparatus according to claim 7 wherein the pickup means comprise flexible straps attached to the decelerator canopy so that they lie substantially in the horizontal plane when the canopy and aerostat envelope are deployed and loops formed in the straps.

11. Apparatus according to claim 7, an aircraft and engaging means attached to the aircraft for engaging said pickup means.

12. Apparatus according to claim 11 wherein said engaging means includes a hook operatively connected to the aircraft.

13. Apparatus according to claim 10, an aircraft, and engaging means attached to the aircraft for engaging the loops of said flexible straps to make air-to-air pickups.

14. Apparatus according to claim 13 wherein said engaging means includes hook means operatively attached to the aircraft for engagement with the loops of said flexible straps.

15. Apparatus according to claim 13 wherein said engaging means comprises, a boom attached operatively to the aircraft, and grappling means attached to the boom 16. A method of aerial survival comprising, ejecting from an aircraft, and deploying a decelerating canopy portion of an aerostat envelope, the lower portion of said aerostat enevlope being attached to said canopy portion, deploying downwardly the lower portion of said aerostat envelope, and forming an inflated aerostat enevlope, and heating air in said deployed aerostat envelope to control the altitude of said aerostat envelope.

17. The method of claim 16 comprising making an air-to-air pickup of the canopy and aerostat envelope from an aircraft.

18. The method of claim 16 comprising jettisoning for landing unnecessary equipment.
for engaging the decelerator canopy and aerostat envelope.

References Cited
UNITED STATES PATENTS

| | | | |
|---|---|---|---|
| 2,967,677 | 1/1961 | Winzen et al. | 244—32 X |
| 3,020,011 | 2/1962 | Beem et al. | 244—122 X |
| 3,131,889 | 5/1964 | Yost | 244—31 |
| 3,154,268 | 10/1964 | Struble | 244—32 |
| 3,168,266 | 2/1965 | Yost | 244—138 |
| 3,176,327 | 4/1965 | Oberth | 244—31 X |
| 3,251,566 | 5/1966 | Chappell | 244—31 |

FERGUS S. MIDDLETON, Primary Examiner

R. A. DORNON, Assistant Examiner

U.S. Cl. X.R.

244—145, 152